United States Patent Office 2,884,257
Patented Apr. 28, 1959

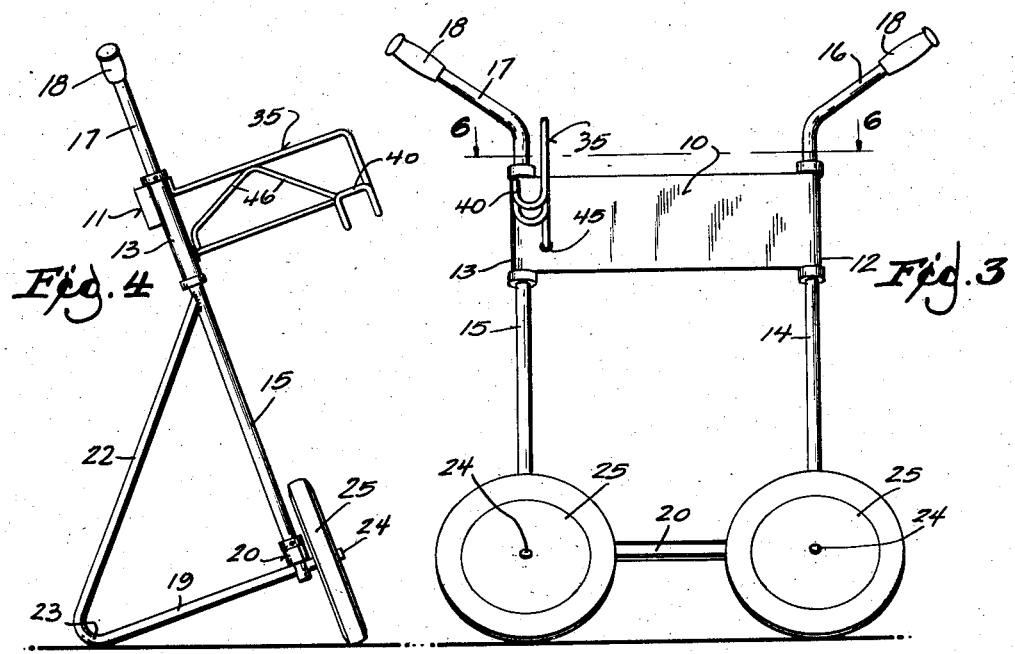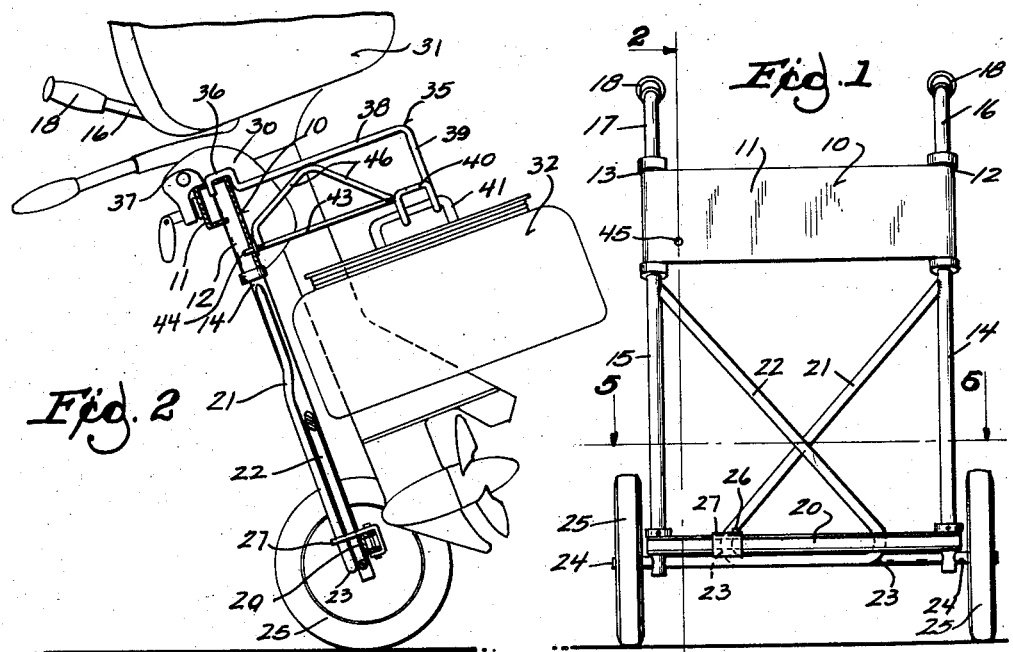

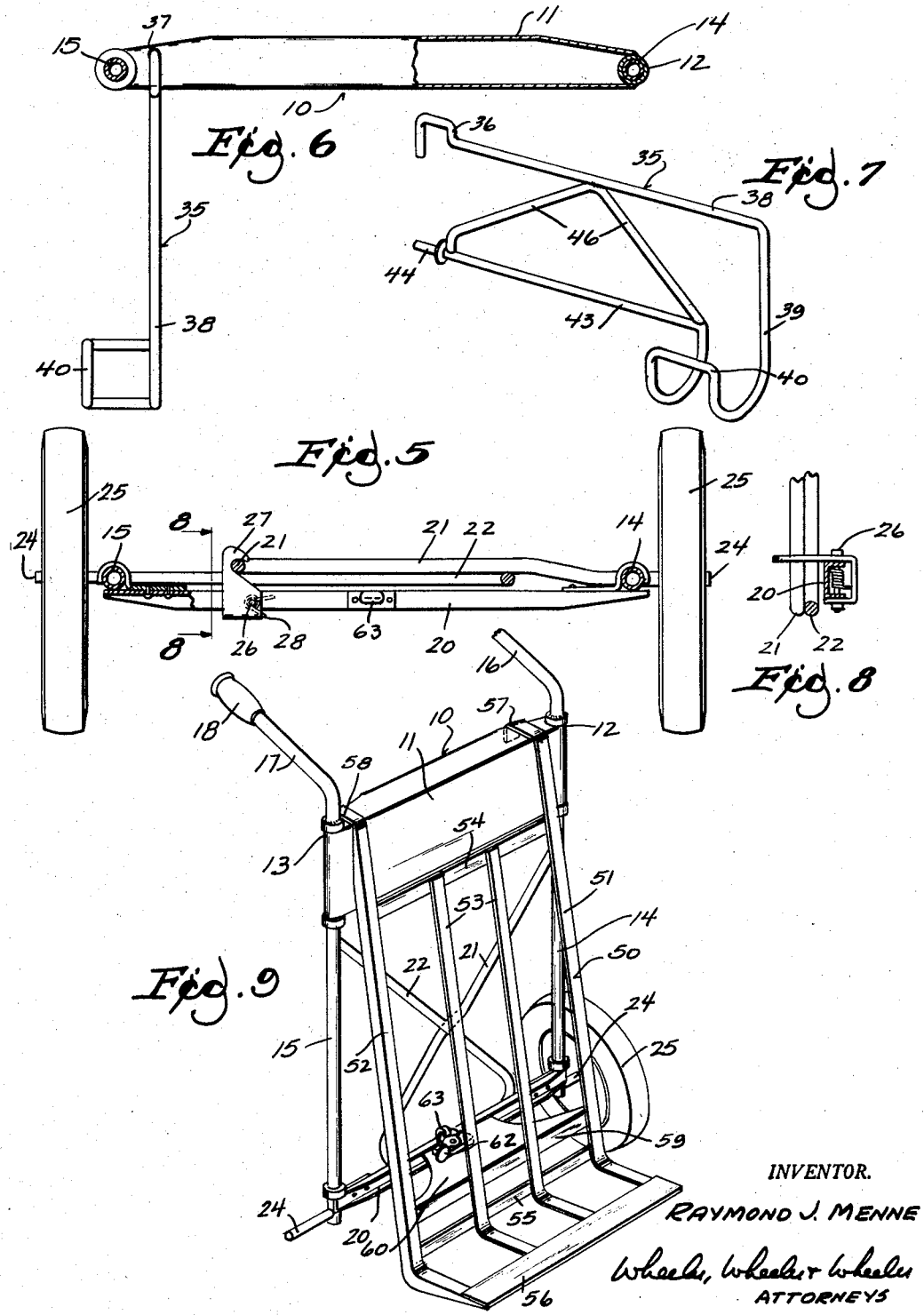

2,884,257

FOLDABLE HAND TRUCK AND DISPLAY RACK

Raymond J. Menne, East Troy, Wis.

Application September 7, 1955, Serial No. 532,821

11 Claims. (Cl. 280—40)

This invention relates to a foldable hand truck and display rack.

The device is peculiarly adapted for the display and transportation of outboard motors, but it has an attachment enabling it to serve any hand truck purpose.

Handle bars are connected with shafts which are rotatably journaled in a work-supporting frame and which carry wheel bearing skeins at their lower ends. The shafts are individually provided with braced legs which, with the skeins projecting laterally, and the wheels parallel, are folded transversely of the truck. Upon release of a latch, the handle bars and their shafts may be rotated to bring the wheels into a common plane transversely of the truck and to extend the braced legs rearwardly whereby the work carried by the truck may be displayed or stored in a minimum of space.

One detachable arm is provided for supporting a separate outboard motor fuel tank or the like, the frame of the truck being specifically designed to receive the transom bracket of an outboard motor. A separate attachment hooks over the frame and is detachably connected at the bottom of the truck and has forwardly extending baggage support to enable other baggage to be transported.

In the drawings:

Fig. 1 is a front elevation of a truck embodying the invention as it appears in condition for use, but without attachments.

Fig. 2 shows the truck in cross section in the plane indicated at 2—2 in Fig. 1, an outboard motor and its separate fuel tank being shown in side elevation.

Fig. 3 is a view of the truck in front elevation as it appears in its storage or display position, and with the fuel tank supporting attachment in place.

Fig. 4 is a view in side elevation of the parts shown in Fig. 3.

Fig. 5 is an enlarged detail view taken in transverse section on the line 5—5 of Fig. 1.

Fig. 6 is an enlarged detail view taken in section on the line 6—6 of Fig. 3.

Fig. 7 is an enlarged detail view in perspective of the tank-supporting attachment.

Fig. 8 is a view taken in section on the line 8—8 of Fig. 5.

Fig. 9 is a view in perspective illustrating an attachment to facilitate the handling of baggage other than outboard motors, one of the wheels of the truck being omitted.

The frame 10 comprises a plate having its upper margin folded rearwardly, downwardly and inwardly to provide a box section as indicated at 11 in Fig. 2 and Fig. 6. At its ends, the frame plate is welded to the sleeves 12 and 13 in which the handle shafts 14 and 15 are respectively journaled at their upper ends. These shafts are respectively provided with handle bars 16 and 17 having grips 18 for convenience of manipulation.

The lower ends of the shafts 14 and 15 are journaled in bearings provided at the ends of a supplemental frame member 20 which may conveniently comprise a channel as best shown in the cross section of Fig. 8.

The shafts 14 and 15 are respectively provided with legs 21 and 22 which extend downwardly and rearwardly from the respective shafts 14 and 15 from a point immediately beneath their respective bearings 12 and 13. The legs comprise rods which are bent upon themselves to provide ground-engaging portions at 23, the rods extending thence through openings in the lower ends of the respective handle bar shafts 14 and 15 and being extended to constitute axle skeins at 24 upon which the wheels 25 are rotatably mounted.

A pintle 26 extending vertically through the flanges of the frame channel 20, as best shown in Fig. 8, rotatably supports the latch hook 27 which is biased for clockwise rotation on pintle 26 as viewed in Fig. 5, the bias being provided by a torsion spring 28. With the legs 21 and 22 and the respective braces 19 folded as shown in Figs. 1, 2 and 5, the leg 22 being on the inside and the leg 21 slightly offset to lie on the outside as shown in Fig. 5, the hook 27 is engaged with leg 21 to maintain the parts in the stated position with the two axle skeins 24 projecting laterally in opposite directions and the wheels 25 parallel. The transom bracket 30 of an outboard motor such as that generically indicated at 31 may now be engaged over the box section 11 of the frame elements 10 with the shaft housing and lower unit of the outboard motor depending in front of the supplemental frame 20. The handles 16 and 17 now project rearwardly in parallelism with each other in a position convenient for use in propelling and guiding the hand truck with the outboard motor supported thereon.

If it be desired to store the motor, or perhaps leave it mounted for display, it is only necessary to release the latch 27, whereupon the individual handle bars 16 and 17 may be used to oscillate their respective shafts in opposite directions in the bearings 12 and 13, the handle bars being moved into a common plane at the upper end of the device and the wheels 24 into a common plane at the lower end of the device as shown in Fig. 3. Th legs 21 and 22 will now project rearwardly to support the truck and its load in a rearwardly inclined position as shown in Fig. 4. In order that the parts may cooperate as described, the legs and axle skeins project oppositely from their respective handle bar shafts in a common plane which is normal to the direction in which the handle bars project from such shaft.

If the outboard motor is of the type having a separate fuel tank such as that shown at 32, the tank may be transported simultaneously with the motor by mounting on the frame 10 a special bracket which may be of a type indicated in Figs. 2, 4, 6 and 7. This bracket 35 is made of heavy wire or rod to include a hook portion 36 for which the top web of the box section 11 of frame 10 is provided with an opening at 37. From the hook portion, the rod extends outwardly at 38 and downwardly at 39 and has a bight 40 formed to provide a broad hook to receive the handle 41 of the fuel tank 32. Thence the rod extends back at 43 to a terminal stud 44 for which the frame 10 has a socket at 45. A separate brace 46 is welded between the upper and lower members 38 and 43 of the bracket 35 to make the bracket rigid.

In normal use, the frame 10 is rearwardly inclined toward the operator who grasps its ends. This throws the center of gravity of the frame and the supported outboard motor at the rear of a vertical line through the axle. The fuel tank, on the other hand, is disposed forwardly of a vertical line through the axle. Therefore, the weight of the fuel tank and its contents counterbalances the weight of the motor so that the device is in substantial balance during transportation.

Where loads other than an outboard motor are to be transported, a simple adapter 50 is employed as shown in Fig. 9. This adapter comprises a frame having side angles 51, 52 and intermediate bars 53 which are cross connected at 54 and 55 and bent outwardly, where they are further cross connected by a terminal shoe at 56. The side bars 51 and 52 are formed with hooks 57 and 58 at their upper ends, these being engageable over the box portion 11 of the main frame 10. Near the lower end of the attachment, the side angles 51 and 52 and the intervening straps 53 are further connected by a flange 59 of a plate 60 which has a latch member 62 of the type commonly used on the check rail of a window sash, the supplemental frame member 20 of the hand truck having a complementary keeper 63 of the type commonly used on the check rail of the upper sash of a window. With the detent 62 engaged in the channel provided by keeper 63, the attachment 50 is rigidly connected with the hand truck in such a way that its hooks 58 cannot become disengaged from the frame 10 of the hand truck. Even heavy trunks and the like can readily be transported when the hand truck is equipped with this attachment. Yet the attachment is instantly removable by simply releasing the latch detent 62 and lifting the attachment free of the hand truck.

The handle bars and wheels and legs can be swung to and from transporting position and display position as readily when the attachment 50 is in place as is possible when the hand truck is free of the attachment. The plate 60 holds the lower end of the attachment out of the path of swinging movement of the wheels 25 and has its side margins relieved to accommodate the movement of the wheels to the position of Fig. 3. This makes it possible for any load to be stored on the truck if desired, the manipulation of the shafts being so easy as to make it appropriate to use the legs for temporary support even when the transportation of the load is interrupted only momentarily. Thus, the truck is adapted to handle a wide variety of loads either for transportation or momentary or indefinite storage or display without requiring tools or any appreciable time for conversion from the load transporting position in which the wheels are locked in parallelism to the load storage position in which the wheels are out of service except that they contribute to the support.

I claim:

1. A hand truck comprising the combination with frame means providing generally upright bearings, of shafts mounted for oscillation in the bearings, axle skeins projecting laterally from the respective shafts, wheels on the axle skeins and movable in the oscillation of the shafts between generally parallel positions at opposite sides of the frame means and positions of substantial alignment in a direction transversely of the frame means, and leg means connected with the shafts and projecting therefrom substantially in the planes of the skeins whereby the leg means are movable between first positions of storage behind the frame means and second positions in which they cooperate with the wheels in the support of the frame means and project rearwardly therefrom.

2. The device of claim 1 in which the shafts are provided with handle bars.

3. The device of claim 1 in further combination with means for latching the leg means in storage position with the wheels in substantial parallelism at opposite sides of the frame means.

4. The device of claim 1 in which the frame means is provided with supplemental frame means in which the shafts are provided with bearings near their lower ends, the said leg means latching behind the supplemental frame means in the storage position of the leg means and the supplemental frame means being provided with a detent detachably engaged with the leg means which is outermost in said storage position whereby to secure both leg means in said storage position with the wheels in substantial parallelism at opposite sides of the frame means.

5. In a device of the character described, a horizontally extending frame member having laterally spaced bearings, generally upright shafts journaled in such bearings, supplemental frame means below said member having complementary bearings for such shafts, handle bars connected with the upper ends of said shafts, and axle skeins connected with said shafts near their lower ends and projecting laterally therefrom when the handle bars project in a generally rearward direction, together with wheels rotatably mounted on said skeins and movable in the oscillation of said shafts between positions of substantial alignment forwardly of the shafts and positions of substantial parallelism beside the respective shafts, said shafts having leg and brace means extending oppositely from respective skeins.

6. The device of claim 5 in which the respective shafts have apertures through which portions of the leg and brace means extend to constitute said skeins.

7. The device of claim 5 in which the leg and brace means are mutually offset to be disposed in mutual contact behind the supplemental frame means when the wheels are disposed beside said shafts, together with means for latching the leg and brace means to maintain the wheels in substantial parallelism beside their shafts.

8. In a device of the character described, the combination with frame means having laterally spaced generally upright bearings, of shafts oscillatable in the respective bearings and individually provided with handle bars, leg and brace members connected with the upper portions of said shafts and extending downwardly and rearwardly from the shafts and thence connected back to lower portions of said shafts, the leg and brace means being respectively disposed in planes substantially at right angles to the respective handle bars, and axle skeins projecting laterally from the shafts oppositely to the respective leg and brace means and provided with supporting wheels.

9. The device of claim 8 in which portions of the leg and brace means extend beyond the respective shafts and constitute said skeins.

10. In a hand truck, the combination with an upper transverse frame member provided at laterally spaced points with generally parallel and generally upright bearings, of a lower transverse frame member having bearing means substantially aligned with respective bearings aforesaid, shaft-skein-leg assemblies comprising generally upright shafts journaled in the bearings of the upper frame member and guided in the bearing means of the lower frame member, skeins connected with the respective shafts and disposed substantially at right angles thereto and provided at one side of the respective shafts with wheels and at the other side of the respective shafts with legs substantially in the planes of the respective skeins, the respective shaft-skein-leg assemblies being oscillatable in the said bearings between frame transportation positions in which the skeins extend laterally therefrom and the legs extend transversely in substantial parallelism with each other, and storage positions in which the skeins project forwardly while the legs are laterally spaced and project rearwardly therefrom in substantial parallelism.

11. The truck of claim 10 in which the shafts are provided remote from the skeins with handles disposed obliquely respecting the shafts and substantially in planes which include the shafts and are at right angles to the skeins.

References Cited in the file of this patent

UNITED STATES PATENTS

| | | |
|---|---|---|
| 1,407,235 | Taylor | Feb. 21, 1922 |
| 1,409,838 | Emery et al. | Mar. 14, 1922 |
| 1,490,650 | Wagner | Apr. 15, 1924 |
| 1,679,325 | Black | July 31, 1928 |
| 1,716,611 | Wilson | June 11, 1929 |
| 2,018,527 | Kerr | Oct. 22, 1935 |
| 2,767,996 | Seyforth | Oct. 23, 1956 |